United States Patent [19]

Ghodsizadeh et al.

[11] Patent Number: 4,830,645
[45] Date of Patent: May 16, 1989

[54] FREEZE CONCENTRATION SYSTEM AND METHOD

[75] Inventors: Yousef Ghodsizadeh, Worthington; David A. Seitz, Marysville, both of Ohio

[73] Assignee: Nestec S.A., Vevey, Switzerland

[21] Appl. No.: 217,732

[22] Filed: Jul. 11, 1988

Related U.S. Application Data

[63] Continuation-in-part of Ser. No. 165,961, Mar. 9, 1988, abandoned, which is a continuation of Ser. No. 70,651, Jul. 15, 1987, abandoned.

[51] Int. Cl.$^4$ .......................... B01D 9/04; C02F 1/22
[52] U.S. Cl. ........................................ 62/541; 62/123; 62/544
[58] Field of Search ................. 62/532, 541, 542, 544, 62/123

[56] References Cited

U.S. PATENT DOCUMENTS

| | | | |
|---|---|---|---|
| 2,540,977 | 2/1951 | Arnold | 62/124 |
| 3,333,436 | 8/1967 | Johnson et al. | 62/545 |
| 3,402,047 | 9/1968 | Shaul | 62/123 |
| 3,681,932 | 8/1972 | Huber et al. | 62/123 |
| 4,188,797 | 2/1980 | Thijssen et al. | 62/545 |
| 4,316,368 | 2/1982 | Van Pelt et al. | 62/544 |
| 4,332,140 | 6/1982 | Thijssen et al. | 62/545 |
| 4,338,109 | 7/1982 | Thijssen et al. | 62/541 |
| 4,406,679 | 9/1983 | Wrobel et al. | 62/542 |
| 4,459,144 | 7/1984 | Van Pelt et al. | 62/545 |
| 4,557,741 | 12/1985 | Van Pelt et al. | 62/541 |

*Primary Examiner*—Ronald C. Capossela

[57] ABSTRACT

A continuous, counter current freeze concentration system and method for concentrating aqueous solutions such as fruit juices, coffee and cold water soluble tea extracts, milk, beer, wine, vinegar, and the like in which the aqueous liquid is passed through one or more concentrating stages, each of which include a crystallizer associated with a gradient column, to crystallize ice in each of the stages and increase the concentration of the liquid, and the ice formed in each stage is passed in reverse direction through the stages. Ice crystals are separated and removed from the system in a wash column associated with the first stage, and concentrated liquid is removed as product from the last stage. The environment viscosity of ice crystals formed in each stage is reduced by forming the ice crystal fraction of the slurry produced in the crystallizer of each stage into a porous rising bed of agglomerated ice crystals in the gradient column associated with the crystallizer, and contacting the ice bed with a counter current flow of more dilute liquor whereby liquor occluded on the ice crystals is displaced with more dilute liquor as the ice bed rises in the column, thereby facilitating the removal of liquor occluded on the ice and promoting the growth of ice crystals in the system.

42 Claims, 5 Drawing Sheets

FREEZE CONCENTRATION SYSTEM AND METHOD

This application is a continuation-in-part of application Ser. No. 07/165,961 filed Mar. 9, 1988 now abandoned, which is a continuation of application Ser. No. 07/070,651 filed, July 15, 1987, now abandoned.

BACKGROUND OF THE INVENTION

This invention relates to a continuous, counter current system and method for the freeze concentration of aqueous solutions. More particularly, the invention relates to the freeze concentration of aqueous comestible solutions, such as fruit juices, coffee and cold water soluble tea extracts, milk, wine, beer, vinegar, and the like, utilizing an improved system and method for reducing the environmental viscosity of ice crystals formed during freeze concentration to thereby facilitate the removal of liquor occluded on the ice crystals and promote the growth of ice crystals in the system.

Freeze concentration procedures are based on the principle that ice crystals which are formed upon cooling an aqueous solution to its freezing point, exclude dissolved solutes as they form to provide ice crystals of pure water in a more concentrated liquid. Freeze concentration is used in a number of commercial procedures, both those in which it is desired to recover the ice crystals as the product of the process such as in the desalination of sea water, the treatment of industrial wastes, and the like to produce pure water, and those in which it is desired to increase the concentration of a dilute solution and recover a concentrated liquor from the ice crystals as a product of the process, such as in concentrating solutions or suspensions containing comestibles, such as coffee or tea extracts, citrus juices, fruit juices, milk, wine, beer, vinegar, and the like.

Regardless of whether ice crystals or concentrated liquor is the desired product, freeze concentration systems basically involve the steps of cooling the aqueous solution until water freezes out in the form of ice crystals, separating the ice crystals thus formed from the resulting concentrated liquor, removing occluded liquor from the crystals and removing the ice crystals from the system. In continuous freeze concentration procedures, the solution to be concentrated passes through several cycles or states, becoming progressively more concentrated, until a desired degree of concentration is reached. As ice crystals form in progressively more concentrated solutions, the more concentrated solutions are more viscous and thus more difficult to remove from the ice crystals. Moreover, the rate of ice crystal growth is related inversely to the concentration of the liquid surrounding it, so that when the concentration of the solution is relatively high, the ice crystals produced are relatively small. This further increases the difficulty of removing liquor from the ice crystals, since it is more difficult to remove occluded liquor from small crystals than large crystals.

The removal of the liquor adhering to the surfaces of the ice crystals is a critical step in the efficient operation of all freeze concentration procedures. Generally the most efficient means for removing liquor adhering to the crystals is a wash column in which a packed bed of ice crystals is washed with water to remove liquor occluded on the ice crystals. The efficiency of a wash column is inversely proportional to the viscosity of the adhering liquor, and directly proportional to the square of the effective crystal diameter. Thus, in order to facilitate the removal of occluded liquor from the crystals, it is desirable to reduce the viscosity of the liquid surrounding the ice crystals. One procedure which has been used heretofor for accomplishing this is to introduce the solution to be concentrated between the crystallizer in which the ice crystals are formed and the wash column in which the ice crystals are purified, and thereby create a counter current flow of the solution and ice crystals in the system.

The prior art contains a number of disclosures pertaining to such counter current flow of liquor and ice crystals in a freeze concentration system. For example, Thijssen, H. A. C., "Freeze Concentration", paper presented at Symposium on Advances In Dehydration and Preconcentration, International Union of Food Science and Technology, Selsdon Park, England, Sept., 1973, discloses the principle of countercurrent flow of liquor and ice crystals in a freeze concentration system and describes the advantages to be obtained by introducing liquid feed between the crystallizer and the wash column. Similarly, U.S. Pat. Nos. 2,540,977 to Arnold; 3,402,047 to Shaul, 3,681,932 to Huber et al; 4,338,109 and 4,332,140 to Thijssen et al; 4,406,679 to Wrobel et al; 4,459,144 to Van Pelt et al and 4,557,741 to Van Pelt each disclose a continuous freeze concentration process in which some variation of counter current flow of ice crystals and liquor is utilized. However, each of these prior systems and processes suffer from one or more disadvantages which adversely affect their effectiveness and efficiency in commercial operations.

SUMMARY OF THE INVENTION

The present invention provides a continuous counter current freeze concentration system and method which effectively reduces the environment viscosity of ice crystals formed in the system to thereby facilitate the displacement of liquor occluded on the surface of the crystals and promote the rate of ice crystal growth. In the present invention, the aqueous liquor to be concentrated is passed through one or more concentrating stages, each of which includes a crystallizer associated with a gradient column, and a liquor recycle loop through which liquor discharged from the gradient column is circulated through the crystallizer and back to the gradient column. Ice is crystallized from the liquor in the crystallizer in each of the stages to thereby increase the concentration of the liquor, with the ice formed in each stage being introduced into the gradient column of that stage and moving in a direction counter to a flow of liquor to be concentrated. Thus, ice crystals produced in the crystallizer of each stage are separated from the liquor and formed into a porous, moving bed of agglomerated ice crystals in the gradient column of the stage. Liquor occluded on the surface of the crystals in the ice bed is displaced by a counter current flow of more dilute liquor. The ice crystals occluded with the more dilute liquor, are removed from the ice bed and transferred to the more dilute liquor which is circulated to the crystallizer of the preceding stage or to a wash column. While the present invention may be operated as a single or multiple stage system, it is generally preferred to operate the system as a two-stage system.

The preferred two-stage system utilizes two concentrating stages and contains two gradient columns (in each of which the porous, moving bed of agglomerated ice crystals is formed), a crystallizer associated with each gradient column, and a single wash column. Liquor recycle loops are provided to circulate liquor around the crystallizer of each concentrating stage, and between the first concentrating stage and the wash column. Feed liquor, i.e. the aqueous solution to be concentrated, which typically has a solids concentration of about 2% to 20%, is concentrated in the first concentrating stage to produce liquor of intermediate concentration (i.e. 10% to 30% solids), and a concentrated or heavy liquor (i.e. 36% to 50% solids) in the second concentrating stage. A portion of the heavy liquor is withdrawn as product from the second concentrating stage.

Ice crystals are produced in crystallizers associated with both stages. The ice produced in the second stage crystallizer is occluded with concentrated or heavy liquor. A slurry of this ice in heavy liquor is introduced into the second stage gradient column, with the ice fraction of the slurry being formed into a porous bed of agglomerated ice crystals which rise through the gradient column counter current to a flow of intermediate concentration liquor, obtained as a filtrate from the first stage gradient column, which percolates through the ice bed. Heavy liquor adhering to the surfaces of the ice crystals in the ice bed in the second stage gradient column is displaced by the counter current flow of the intermediate concentration liquor as the ice bed rises through the column. The liquor fraction of the slurry is returned to the second stage crystallizer, whereas ice, from which heavy liquor has been displaced, is removed from the ice bed in the second stage gradient column and transferred to intermediate concentration liquor. This slurry is introduced into the first stage crystallizer in which additional ice is formed. The slurry of ice and intermediate concentration liquor produced in the first stage crystallizer is introduced into the first stage gradient column. The ice fraction of this slurry, occluded with intermediate concentration liquor, is formed into a porous bed of agglomerated ice crystals which rise through the first stage gradient column counter current to a flow of feed concentration liquor. The liquor fraction of the slurry introduced into the first stage gradient column is separated from the ice and introduced into the second stage gradient column in which it is utilized to displace heavy liquor occluded on the ice crystals in the ice bed and to carry ice crystals removed from the ice bed to the first stage crystallizer. In the first stage gradient column, intermediate concentration liquor occluded on the ice crystals is displaced by the counter current flow of feed concentration liquor. The ice crystals, from which intermediate concentration liquor has been displaced by feed concentration liquor, are removed from the ice bed and transferred to feed concentration liquor which is introduced into a wash column, where following bed compaction and a growth period, the occluded feed concentration liquor is displaced from the ice by clean water, with the feed concentration liquor being recirculated to the first stage gradient column.

The present invention is particularly applicable to freeze concentration operations in which it is desired to increase the concentration of a dilute solution to recover concentrated mother liquor as the product, such as in the concentration of fruit juices, coffee and cold water soluble tea extracts, milk, beer, wine, vinegar, etc. The invention is also applicable to freeze concentration operations in which it is desired to recover pure water as the product, such as in the desalination of sea water, purification of industrial wastes, etc.

The freeze concentration system and method of this invention offer significant advantages over prior art systems and methods. The invention provides efficient displacement of heavy and intermediate concentration liquor from ice crystals and facilitates the growth of relatively large ice crystals within a short period of time. The period of time required for crystal growth is substantially reduced since crystal growth occurs at feed concentrations. The relatively large ice crystals promote effective washing of the ice with high capacities in the wash column, and result in significant reduction in the loss of solutes in the system.

DESCRIPTION OF THE INVENTION

Figure 1:
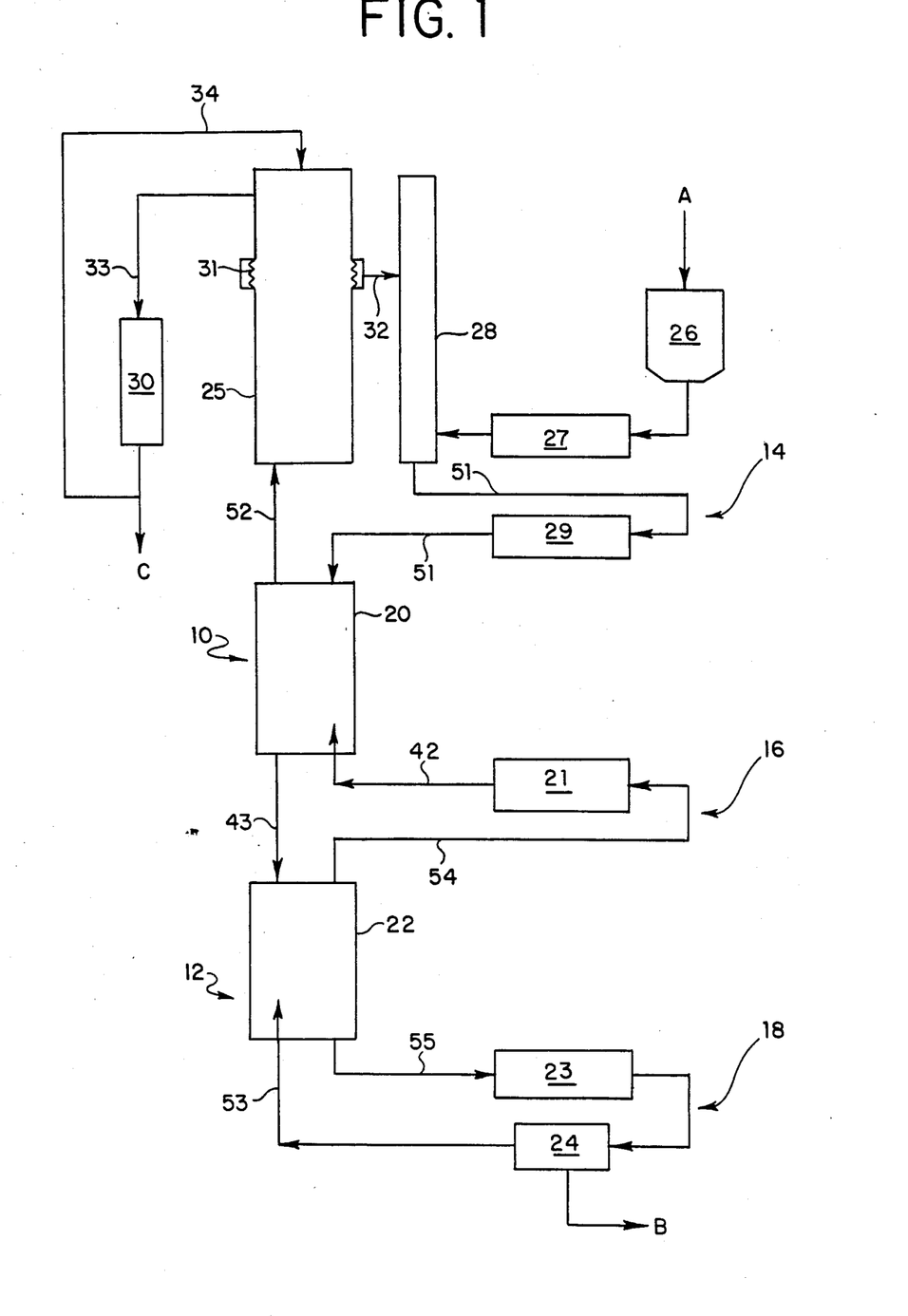
FIG. 1 is a schematic representation, of one embodiment of a two-stage counter current freeze concentration system of the present invention.

Reference is made to FIG. 1 which illustrates in schematic form a counter current freeze concentration system of the present invention having two concentrating stages generally indicated as 10 and 12, both of which include a gradient column and a crystallizer. It will be understood that the present invention can be utilized with only a single concentrating stage or with more than two concentrating stages, if necessary and appropriate to achieve a desired concentration. The aqueous liquid to be concentrated (or from which water is to be recovered) enters the system at A and is circulated through the system by means of three recycle loops, namely, feed liquor recycle loop 14 which circulates feed concentration liquor between the first concentrating stage 10 and a wash column 25; an intermediate concentration liquor recycle loop 16 which circulates liquor around the crystallizer of the first concentrating stage; and a concentrated liquor recycle loop 18 which circulates concentrated or heavy liquor around the crystallizer of the second concentrating stage.

The first concentrating stage 10 includes a crystallizer 21 which produces a slurry of ice in intermediate concentration liquor, and a first stage gradient column 20 into which the intermediate concentration liquor slurry produced in crystallizer 21 is pumped. In the first stage gradient column 20 the ice fraction of the slurry is separated from the liquor, and the ice crystals are formed into a porous bed of agglomerated ice crystals. Intermediate concentration liquor occluded on the ice crystals is displaced by a counter current flow of feed liquor introduced from feed liquor recycle loop 14 and the ice is removed from the porous bed and transferred to feed liquor circulating in recycle loop 14 for introduction to wash column 25. The second concentrating stage includes a crystallizer 23 which produces a slurry of ice in concentrated or heavy liquor, and a second stage gradient column 22 into which heavy liquor slurry produced in crystallizer 23 is supplied. In the second stage gradient column 22 the ice fraction of the slurry is separated from the heavy liquor, and the ice crystals are formed into a porous bed of agglomerated ice crystals. Heavy liquor occluded on the ice crystals is stripped by and replaced with a counter current flow of intermediate concentration liquor supplied from intermediate concentration liquor recycle loop 16. Ice crystals occluded with intermediate concentration liquor are removed from the porous bed and transferred to intermediate concentration liquor which circulates in recycle loop 16 and are carried to first stage crystallizer 21. The heavy liquor fraction discharged from second stage gradient column 22 enters recycle loop 18 and is passed through second stage crystallizer 23 and reintroduced into column 22. An in-line filter 24 is provided downstream of crystallizer 23 for removal of a portion of concentrated liquor from the system at B.

Crystallizers 21 and 23 both preferably comprise conventional scraped surface heat exchangers which include means (not shown) for passing a cooling medium through external jackets to effectively cool the liquor passing therethrough. Sufficient cooling medium is circulated throu*gh the jackets to freeze a predetermined amount of ice crystals from the liquor passing through the crystallizers. For example, second stage crystallizer 23 cools the liquor in recycle loop 18 to freeze out sufficient ice to increase the solids concentration of the liquor passing therethrough to between about 36% to 50%, preferably between 40% and 45%. First stage crystallizer 21 cools the liquor in recycle loop 16 to freeze out sufficient ice to increase the solids concentration of the liquor to between about 10% to 30%, preferably between 20% and 25%. If desired, several in-series or parallel connected conventional scraped surface heat exchangers may be utilized in either or both of the first and second concentrating stages in place of the single crystallizers 21 and 23 shown in FIG. 1. Other types of crystallizers or cooling equipment capable of cooling the liquor to the desired extent may be used.

The aqueous liquid to be concentrated, which has a solids content of between about 2% to 20%, is supplied at A to feed tank 26 from which it is pumped through cooling unit 27 to initially cool the feed liquor and into surge tank 28 where it enters feed liquor recycle loop 14 and is combined with feed liquor separated in the wash column. The combined feed liquor is carried in line 51 through cooling unit 29, in which the liquor is chilled to its freezing point, and introduced into the top of first stage gradient column 20. Cooling units 27 and 29 may each comprise conventional scraped surface heat exchangers which include means (not shown) for passing a cooling medium through external jackets to cool the liquor to the desired extent. Other suitable cooling equipment capable of cooling the feed liquor to its freezing point may, of course, be used.

The major portion of the feed liquor introduced into gradient column 20 remains in feed liquor recycle loop 14, that is, the feed liquor passes from inlet line 51 across the upper portion of column 20 into discharge line 52 and wash column 25, and serves to transfer ice removed from the porous ice bed in column 20 to the wash column. A minor portion of the feed liquor introduced into gradient column 20 (equivalent to the amount of concentrated liquor and washed ice withdrawn from the system at B and C respectively) passes downwardly in gradient column 20 counter current to a porous rising bed of agglomerated ice crystals formed in gradient column 20 from a slurry of ice in intermediate concentration liquor produced in first stage crystallizer 21. Thus, a slurry of intermediate concentration liquor and ice (from both first and second stage crystallizer 21 and 23), which typically contains less than about 25% by wt. of ice, is introduced into the bottom of gradient column 20 through line 42. The liquor fraction of this slurry is separated from the ice fraction and discharged from gradient column 20 through line 43. The ice fraction of the slurry, which is occluded with intermediate concentration liquor, is formed into a loosely compacted porous ice bed which rises in column 20. The counter current flow of feed liquor through the rising ice bed strips and displaces the more viscous intermediate concentration liquor occluded on the ice crystals. The displacement of intermediate concentration liquor occluded on the ice crystals by feed liquor is achieved in the lower portion of the ice bed in gradient column 20, typically in the lower one-third of the ice bed, thereby enabling significant growth of the ice crystals in feed liquor over a substantial portion of the ice bed. As the porous ice bed rises through the column, ice crystals occluded with feed liquor are removed from the top of the ice bed such as by scraping, cutting, etc. and are transferred to the portion of the feed liquor which circulates in recycle loop 14, which carries the resulting slurry of ice in feed liquor from column 20 into the wash column.

The portion of the feed liquor which percolates throughout the porous ice bed in column 20, and the intermediate concentration liquor stripped from the ice bed, are combined with the intermediate concentration liquor fraction separated from the slurry introduced into the bottom of column 20 to join recycle loop 16, and are transferred from first stage gradient column 20 through line 43 into the top of second stage gradient column 22. The concentration of the separated intermediate concentration liquor fraction of the slurry introduced in line 42 is slightly reduced by mixture with the residual portion of the feed liquor. However, by controlling the porosity of the ice bed, as discussed hereinafter, the amount of feed liquor which passes through the ice bed reduces the concentration of the intermediate concentration liquor introduced in line 42 by no more than about 4%, preferably between 1% to 3% (absolute basis). The combined liquor stream which is introduced into second stage gradient column 22 through line 43 is still of intermediate concentration.

The function and operation of second stage gradient column 22 is analogous to the first stage column 20 described above, with the exception that intermediate concentration liquor is used to strip and displace heavy liquor occluded on ice crystals in a porous rising ice bed. Thus, the major portion of the intermediate concentration liquor introduced into column 22 remains in recycle loop 16 in which it passes from inlet line 43, across the top portion of column 22, through line 52 into crystallizer 21 and first stage gradient column 20, and serves to transfer ice from the second stage gradient column 22 to the first stage column. A minor portion of the intermediate concentration liquor introduced into column 22 (equivalent to the amount of concentrated liquor withdrawn from the system at B and the amount of ice introduced into column 22) passes downwardly in column 22 counter current to a porous rising bed of agglomerated ice crystals formed in the gradient column 22 from a slurry of ice in heavy liquor produced in second stage crystallizer 23. A slurry of heavy liquor and ice, which typically contains less than about 25% by wt. of ice, produced in crystallizer 23 is introduced into the bottom of second stage column 22 through line 53. The heavy liquor fraction of this slurry is separated from the ice fraction and discharged from column 22 through line 55. The ice fraction of the slurry, which is occluded with heavy liquor, is formed into a porous ice bed which rises through the column. The downward flow of intermediate concentration liquor through the rising ice bed strips and displaces viscous heavy liquor occluded on the ice crystals, with this displacement occurring in the lower portion of the column, thereby facilitating growth of the ice crystals in the less viscous intermediate concentration liquor. As the porous ice bed rises through the column, ice crystals, occluded with intermediate concentration liquor, are removed from the top of the ice bed in second stage gradient column 22 and transferred to the portion of intermediate concentration liquor which circulates in recycle loop 16. The resulting slurry is transferred from column 22 into first stage crystallizer 21, where additional ice is crystallized out of the liquor and the concentration of the liquor increased slightly, and into first stage gradient column 20.

The portion of the intermediate concentration liquor which passes through the porous ice bed in gradient column 22 and the heavy liquor stripped from the ice bed are combined with the heavy liquor fraction separated from the slurry introduced into the bottom of column 22 to join recycle loop 18, which circulates the liquor through crystallizer 23 and back to column 22. By controlling the porosity of the bed the amount of intermediate concentration liquor so combined with the heavy liquor is controlled so that the concentration of the heavy liquor is reduced by no more than about 10%, and usually no more than about 6% (absolute basis) when the ice fraction of the slurry in line 53 is under 25% by wt. The liquor circulated through second stage crystallizer 23 is cooled to crystallize sufficient ice to increase the solids content of the liquor to a desired degree, usually between about 36% to 50%. The slurry of ice in concentrated liquor is then passed through in-line filter 24, where a portion of the concentrated liquor is removed from the system as product at B, and the remaining portion of the slurry, which typically contains about 10% to 25% by wt. ice fraction, is passed through line 53 into the bottom of second stage gradient column 22.

The slurry of ice in feed liquor removed from the top of first stage gradient column 20 through line 52 is introduced into wash column 25. In the wash column the ice crystals are packed and lifted by recirculation of feed liquor in recycle loop 14. Feed liquor flows upward through the packed ice bed and is drained from the bed through side screen 31 from which it passes into surge tank 28 through line 32. Significant ice crystal growth occurs in the lower portion of the wash column, that is, up to the side screen liquid level. As the packed ice bed moves above the side screen, feed liquor occluded on the ice is displaced by a downward flow of clean water introduced at the top of the wash column through line 34. Clean ice emerges at the top of the wash column with the ice being scraped from the bed by conventional means and carried through line 33 to heating unit 30 in which the ice is melted. A portion of the melted ice is circulated to the top of the wash column in line 34 for use as wash water. The portion of the melted ice not used for washing is removed from the system at C.

As noted hereinabove, ice crystal growth in the system occurs at a significant rate in the upper portion of the first stage gradient column as well as the lower portion of the wash column, and results in the production of ice crystals which may be in excess of 200 microns in size with the ice crystals having a purity such that they contain only between about 0.01% to 0.1% occluded solids.

It will be understood that the system of the present invention also includes additional conventional ancillary equipment such as valves, motors, pumps, etc. which for the purpose of clarity in illustrating the invention have not been shown or described herein. The use of such conventional ancillary equipment in the present invention will be readily apparent to those skilled in the art.

Figure 2:
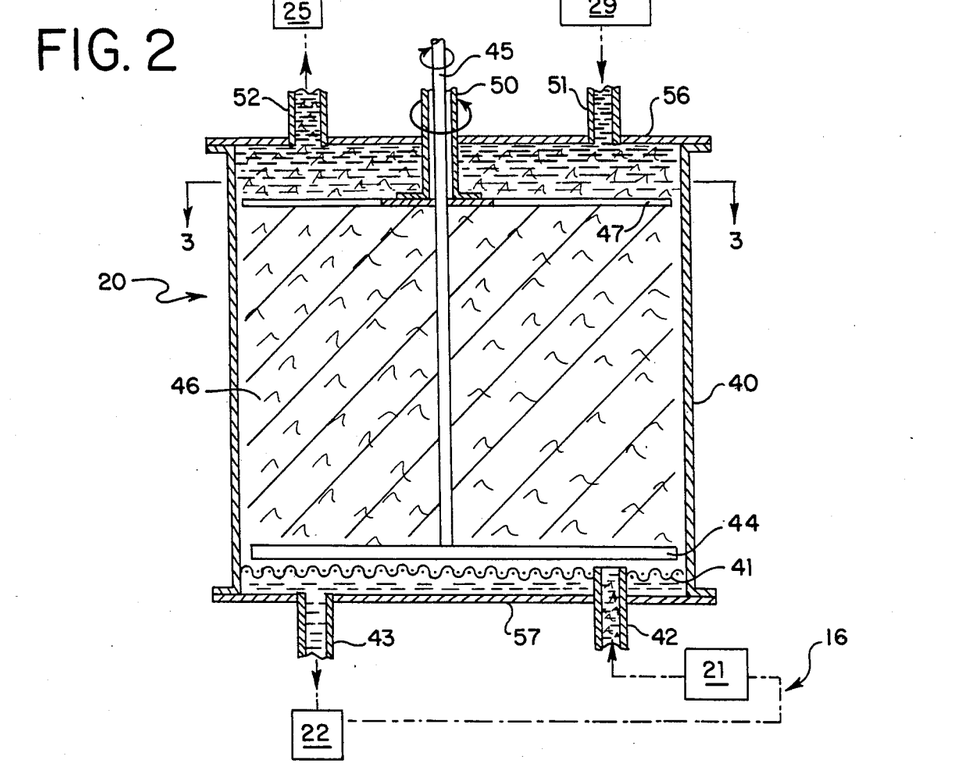
FIG. 2 is a sectional view of the first stage gradient column of the freeze concentration system of FIG. 1.
Figure 3:
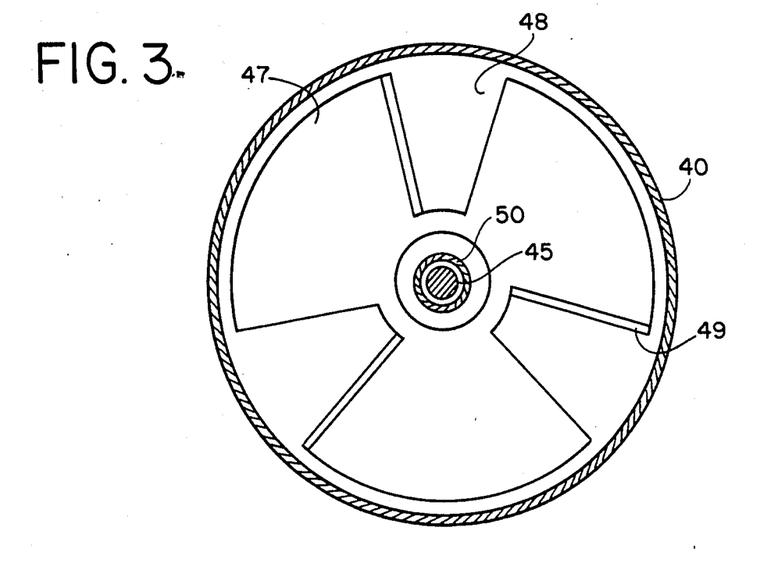
FIG. 3 is a top view of the section taken along line 3—3 of FIG. 2.

First stage gradient column 20 is illustrated in more detail in FIG. 2. As shown therein, gradient column 20 comprises a cylindrical shell 40 closed at its top and bottom ends by plates 56 and 57 respectively. Filter screen 41 is secured across the column, adjacent bottom plate 57. Filter screen 41, is adapted to separate the ice fraction of a slurry from the liquor fraction thereof, and may be of any suitable type, such as a wire mesh screen, perforate metal disc, perforate members supporting filter cloths, and the like. In order to facilitate separation of the slurry fractions, the filter screen preferably has openings between about 0.15 mm to 0.30 mm in size. A slurry of ice crystals in intermediate concentration liquor produced in first stage crystallizer 21 is pumped under pressure through pipe 42 and distributed on the upper surface of filter screen 41, with the liquor fraction of the slurry passing downwardly through the screen and being carried from first stage gradient column 20 through line 43 for introduction into the top of second stage gradient column 22. A scraper blade 44 is mounted on rotating axial shaft 45 just above the upper surface of filter screen 41 so as to keep the screen relatively free of ice. Shaft 45 is rotated by conventional motor means (not shown). Ice crystals (which are occluded with intermediate concentration liquor) deposited on screen 41 are moved upward in the column 20 by the continuous introduction of new ice in the slurry pumped from crystallizer 21 and by the action of rotating scraper blade 44. A rotatable disc 47 having one or more openings extending therethrough is mounted across the column 20 adjacent top plate 56 and substantially covers the cross-section of the column to restrain and regulate the upward movement of the ice crystals. The upward movement of the ice crystals in the column forms the crystals into agglomerates, with the agglomerated ice crystals being formed into a porous bed 46 which rises in column 20 as additional ice is introduced through line 42. As shown more particularly in FIG. 3, disc 47 has scraping or cutting means, such as cutting edges 49, on its lower surface to cut or scrape ice from the top of the ice bed and thereby continuously remove ice from the ice bed. Disc 47 has openings 48 extending therethrough sufficient in size and number to permit ice scraped from the top of the ice bed to pass upwardly through the disc, and to allow the flow of feed liquor downwardly through the disc into the ice bed. Other suitable means may of course be used to restrain and regulate the ice bed, such as, for example, a metal plate having a plurality of openings therein and cutting means affixed to its lower surface, or a disc of expanded metal screen having openings on the order of about 0.2 to 4 cm in size. Disc 47 is mounted for rotation on axial shaft 50 which is rotated by conventional motor means (not shown) capable of rotating the shaft 50 and disc 47 at any desired rate and independently of the rotation of scraper blade 44, for example at a different speed and/or the same or opposed direction.

Chilled feed liquor is delivered to the column 20 at a point above the rotatable disc 47 through inlet pipe 51, and outlet pipe 52 is provided at the opposite edge of the top plate. A major portion of the feed liquor introduced into gradient column 20 through pipe 51 is circulated above disc 47 and serves to carry ice particles scraped from the top of ice bed 46 through pipe line 52 to the wash column. The remaining portion of the feed liquor passes downwardly through openings 48 in disc 47 counter-current to the rising ice bed. This portion of the feed liquor permeates throughout the porous ice bed and displaces intermediate concentration liquor occluded on the ice crystals. Displacement of more viscous occluded intermediate concentration liquor by the less viscous feed liquor is effected in the lower portion of the ice bed, typically in the lower one-third of the bed, thereby facilitating significant growth of ice crystals in the feed liquor environment over a substantial portion of the ice bed. Feed liquor which permeates through the ice bed passes through filter screen 41 and is combined with the intermediate concentration liquor fraction separated from the slurry pumped into the gradient column 20 in recycle loop 16, and the combined liquor (which still has an intermediate concentration) is removed from column 20 through line 43.

The degree of compaction of the ice bed 46 is controlled to promote effective displacement of intermediate concentration liquor occluded on the ice crystals with feed concentration liquor. That is, the degree of compaction of the agglomerated ice crystals is controlled to provide an ice bed which is sufficiently porous to permit the counter current flow of feed liquor throughout the entire bed of agglomerated ice crystals without excessive pressure drop across the bed. A more compacted ice bed, in which the flow of feed liquor through the bed is restricted, is still effective in avoiding backmixing of the feed and intermediate concentration liquors and in displacing intermediate concentration liquor from the ice. Such a more compacted bed is generally undesirable for it results in reduced liquor flow through the ice bed and consequently reduces the capacity of the system or, alternatively, would require a higher pressure drop for the same capacity. However, the ice bed should be sufficiently compacted to prevent or minimize channeling of the feed liquor through the ice bed, which would result in undesirable backmixing of the feed and intermediate concentration liquors and consequently would excessively dilute the concentration of intermediate concentration liquor in line 43. The ice bed should be sufficiently compacted so that the amount of feed liquor which passes through the ice bed is approximately equivalent to the amount of concentrated liquor and washed ice withdrawn from the system, whereby the concentration of the intermediate concentration liquor introduced through line 42 is reduced by no more than about 4% (absolute basis) when the ice fraction of the slurry in line 42 is under 25%.

That is, the concentration of the liquor discharged from the gradient column in line 43 will be no more and 4% (absolute basis) less than the concentration of the liquor fraction of the slurry introduced into the gradient column in line 42. If the bed is not sufficiently compacted, feed liquor channels through the bed resulting in significant backmixing of the feed and intermediate concentration liquors, which would adversely affect displacement of intermediate concentration liquor from the ice, and would increase the concentration of the feed liquor (thereby promoting poor crystal growth). Moreover, intermediate concentration liquor in line 42 is diluted to an undesirable extent when the bed is not sufficiently compacted. The degree of compaction of the ice bed preferably is controlled by varying the rotational speed of disc 47 thereby effecting the rate of ice removal from the bed. Thus, a lower rotational speed of disc 47 removes less ice from the top of ice bed 46 and therefore increases the compaction of the bed, while a higher rotational speed removes more ice and reduces the degree of compaction of the bed. The rate of ice removal required to maintain a desired degree of ice bed compaction will, to some extent, depend on factors such as the rate of slurry introduction into column 20, the ice content of the slurry, the rate of feed liquor introduction into the column, the capacity of the system, the dimensions of the ice bed and the like, and can be readily determined by those skilled in the art. For example, satisfactory operating efficiency can be obtained when the ice bed in the gradient columns has a height to diameter ratio of between about 0.5:1 to 3:1 or more.

Second stage gradient column 22 is similar in construction to first stage column 20 and contains all of the elements described above in connection with column 20. Second stage gradient column 22 is similar in function to first stage gradient column 20 with the exception that in the second stage column ice crystals occluded with heavy liquor (e.g. 36% to 50% solids) produced in crystallizer 23 are formed into a porous bed of agglomerated ice crystals, and the heavy liquor occluded on the ice crystals is stripped by and replaced with intermediate concentration liquor circulating in recycle loop 16. The degree of compaction of the ice bed in second stage gradient column 22 is controlled in the manner described above in connection with ice bed 46, with the exception that the compaction of the ice bed is such that the amount of intermediate concentration liquor which passes through the ice bed is approximately equivalent to the amount of concentrated liquor withdrawn from the system plus the amount of ice introduced into the second stage gradient column. Bed compaction is such hat when the ice fraction of the slurry in line 53 is under 25%, the concentration of the heavy liquor fraction in line 53 is reduced by no more than about 10% (absolute basis) by intermediate concentration liquor passing through the bed. Ice crystals removed from the top of the ice bed in second stage gradient column 22 are occluded with inter- mediate concentration liquor and are transferred to a portion of the intermediate concentration liquor circulating in recycle loop 16 and carried through crystallizer 21 and introduced into the bottom of first stage gradient column 20.

Figure 4:
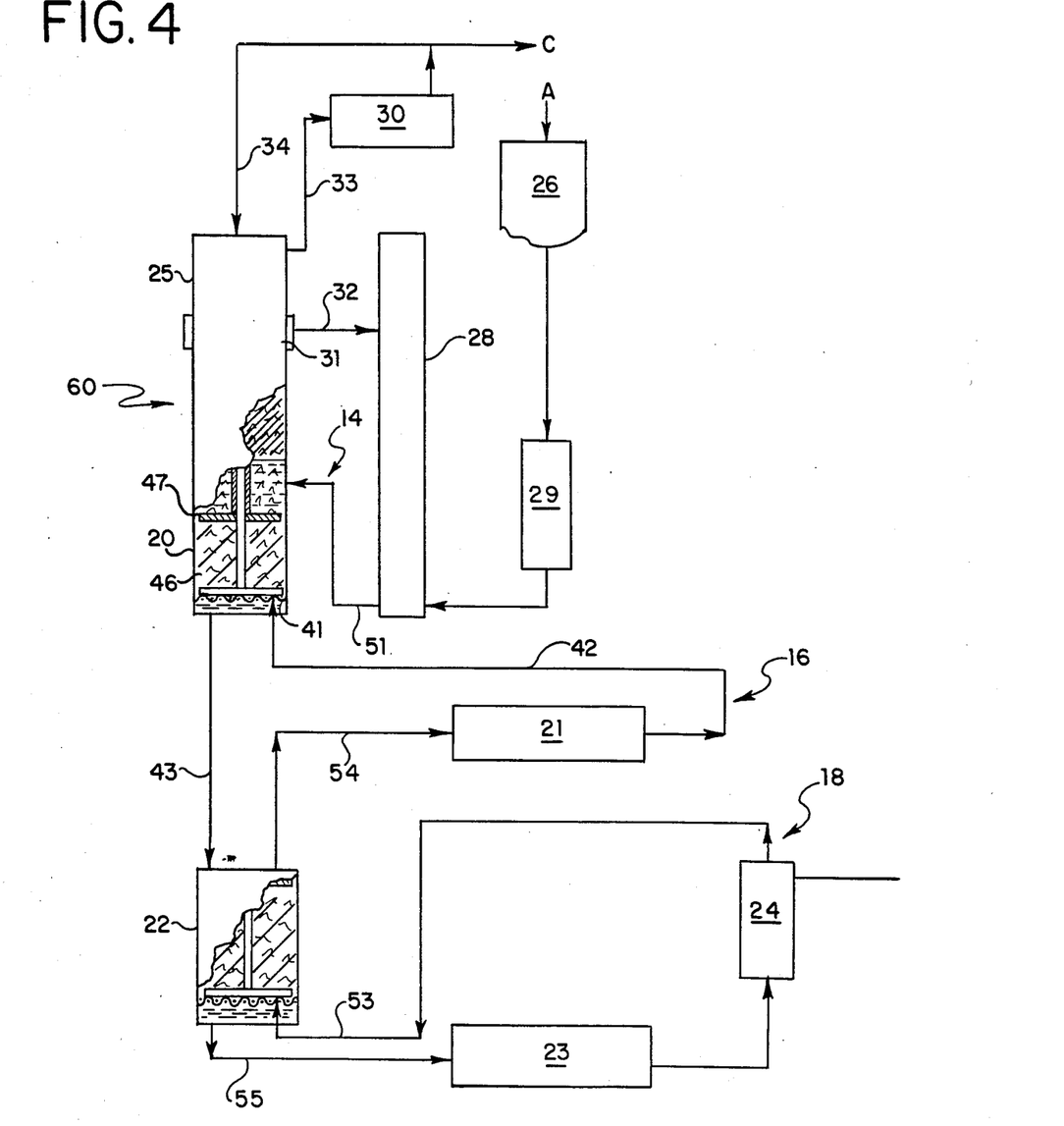
FIG. 4 is a schematic representation, partially in section, of another embodiment of a two-stage freeze concentration system of this invention.

FIG. 4 illustrates another embodiment of a two stage freeze concentration system of the present invention wherein the first stage gradient column 20 and the wash column 25 have been combined in a single unit, generally indicated as 60. In all other respects, the system depicted in FIG. 4 is similar in structure and operation to that described in FIG. 1. For the sake of clarity, like numerals have been used to designate like elements. Thus, the system includes two gradient columns 20 and 22, a crystallizer 21 and 23 associated with each gradient column, and a single wash column 25. Feed concentration liquor (2% to 20% solids) is concentrated to an intermediate concentration (10% to 30% solids) in the first stage and to a heavy liquor concentration (36% to 50% solids) in the second stage, with a portion of the heavy liquor being withdrawn as product at B. While the first stage gradient column and the wash column are combined in a single unit, they still perform the same function, in the same manner, as described in FIG. 1. That is, a slurry of intermediate concentration liquor and ice is pumped from crystallizer 21 onto the upper surface of screen 41 in gradient column 20 where the ice fraction of the slurry (occluded with intermediate concentration liquor) is formed into a porous bed of agglomerated ice crystals 46 which rises through the gradient column. Feed liquor, which enters the system at A, is chilled to its freezing point in cooling unit 29 and enters feed liquor recycle loop 14, with the feed liquor being introduced into unit 60 at a point intermediate perforated rotatable disc 47 and the bottom of wash column 25. As described in FIG. 1, a portion of the feed liquor percolates downwardly through the porous ice bed 46 to displace intermediate concentration liquor occluded on the ice as the ice bed rises in the column. Ice crystals occluded with feed liquor are removed from the top of ice bed 46 by rotating disc 47 and are transferred into feed liquor circulating in recycle loop 14. The resulting slurry of ice in feed liquor is carried into the wash column section 25 of unit 60, where the ice crystals are packed and lifted by recirculation of feed liquor between the wash column, the surge tank 28 and gradient column 20. The feed liquor flows upward through the packed ice bed in wash column 25 and is drained off through side screen 31. Clean ice is scraped off the top of the ice bed in the wash column and is carried in line 33 to heating unit 30, with a portion of the melted ice being removed at C. Feed liquor which percolates throughout porous ice bed 46 in gradient column 20 is combined with the intermediate concentration liquor fraction separated from the slurry introduced into the bottom of column 20 and is transferred through line 43 into the top of second stage gradient column 22, which function in the same manner as described above in connection with FIG. 1.

Figure 5:
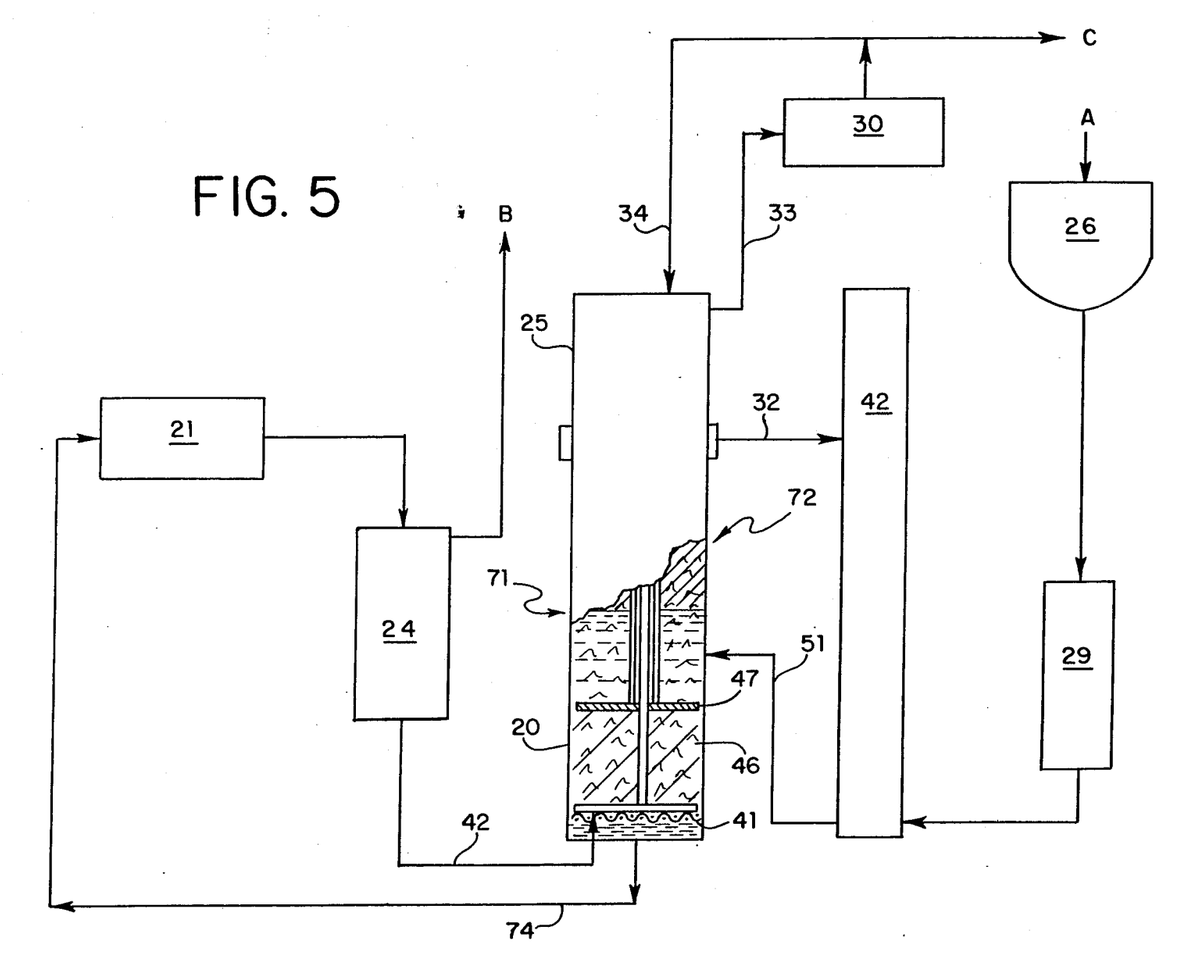
FIG. 5 is a schematic representation, partially in section, of a single stage freeze concentration system embodying the principle of the present invention.

FIG. 5 illustrates a one-stage freeze concentration system embodying the principle of the present invention. This system is similar to that of FIG. 4 in that the gradient column 20 and the wash column 25 have been combined in a single unit, generally designated 71, but has been modified to include only one concentrating stage, that is, gradient column 20 and associated crystallizer 21. Those elements of FIG. 5 which are similar to elements of FIG. 1 have been given similar numerals. The structure and operation of gradient column 20 and wash column 25 in FIG. 5 are identical to those described in FIG. 4. Liquor filtered through filter screen 41 adjacent the bottom of unit 71 is carried through line 74 to one or more series or parallel connected scraped surface heat exchangers 21 which cool the liquor to freeze out sufficient ice to produce a slurry of ice in concentrated liquor, i.e. a solids content of at least about 36%. The resulting slurry is passed through in-line filter 24 to remove a portion of the concentrated liquor from the system at B. The remaining slurry is introduced into the bottom of gradient column 20 through line 42, and the ice fraction of the slurry is formed into a porous bed of agglomerated ice crystals 46 which rises through the gradient column, and in which concentrated liquor occluded on the ice is displaced by chilled feed liquor introduced through line 51 into unit 71 at a point intermediate the upper surface of rotatable disc 47 and the bottom of wash column 25. Ice crystals, occluded with feed liquor, are removed from the top of ice bed 46 by disc 47 and pass through the disc into feed liquor introduced through line 51. The ice crystals so removed are carried by feed liquor into the wash column section 25 of unit 71.

Figure 6:
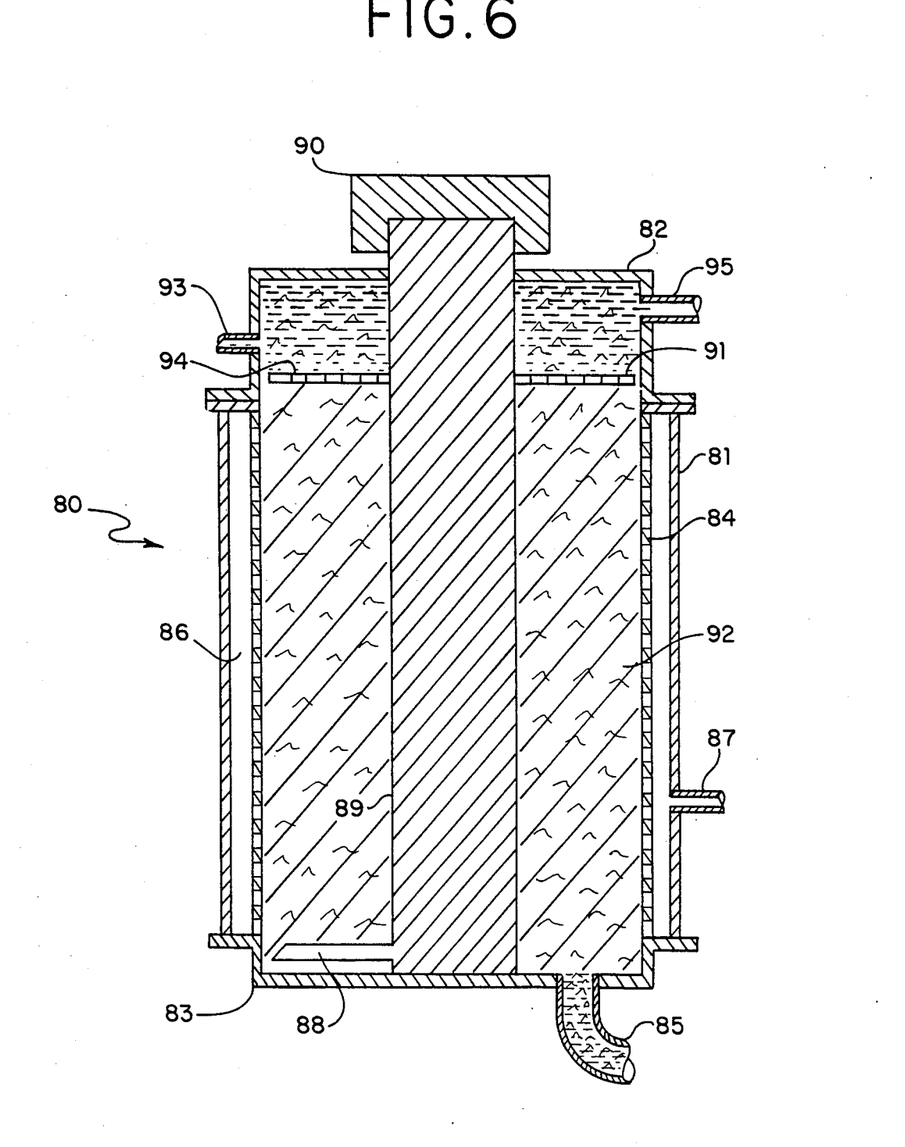
FIG. 6 is a sectional view of another embodiment of the gradient column of the present invention.

FIG. 6 shows another embodiment of a gradient column suitable for use in the freeze concentration system of this invention. The gradient column, generally designated as 80, includes a cylindrical shell 81 closed at its top and bottom ends by cover 82 and bottom cap 83. In this embodiment, a cylindrical filter 84, such as wire mesh screen, perforated metal cylinder and the like is used to separate the ice fraction from the liquor fraction of the slurry which is pumped into the bottom of gradient column through inlet pipe 85. The liquor fraction flows outwardly through filter 84 and enters annular chamber 86 provided between the filter and cylindrical shell 81, from which it is discharged via pipe line 87. The ice crystal fraction of the slurry is moved upward in the column by the continuous introduction of slurry through pipe 85 and the rotation of blade 88 mounted adjacent the bottom of the column. Axial shaft 89, on which blade 88 is mounted, is rotated continually by conventional motor means 90. Rotatable perforated disc 91, mounted on shaft 89 above the upper end of filter 84, restrains and regulates the upward movement of ice crystals in the column so that ice crystals deposited in the column form a porous bed of agglomerated ice crystals 92. Dilute liquor is introduced into the column above the ice bed through line 93, with a portion of the dilute liquor passing through openings 94 in disc 91 and downwardly through the rising porous ice bed to strip and displace more concentrated liquor on the ice crystals. Concentrated liquor displaced from the ice crystals, together with any excess dilute liquor, pass through filter 84 and are discharged through line 87. Ice occluded with dilute liquor is removed from the top of the ice bed by the rotation of disc 91 and is transferred through openings 94 to the portion of the dilute liquor above disc 91, with the resulting slurry leaving the column through outlet 95.

The following examples 1 through 4 set forth the parameters for operation of the two-stage system shown and described in FIG. 1, and example 5 for operation of the single stage system shown and described in FIG. 5. All of the examples are based on the freeze concentration of an aqueous coffee extract, and in which the porous ice beds have a height to diameter ratio of between 0.5:1 to 3:1.

| No. | Liquor Concentration (% solids) | | | Product Temp. (°C.) | Ice Quality (% occluded solids) | Capacity (Kilograms of ice removed per hour) |
|---|---|---|---|---|---|---|
| | Feed | Intermediate | Product | | | |
| 1 | 11 | 21 | 39 | −3.9 | .05 | 950 |
| 2 | 5 | 15 | 42 | −6.6 | .01 | 340 |
| 3 | 10 | 21 | 39 | −3.9 | .05 | 140 |
| 4 | 18 | — | 39 | −5.0 | .07 | 90 |
| 5 | 10 | — | 40 | −4.4 | .01 | 20 |

It will of course be understood that aqueous solutions other than coffee extract may be similarly concentrated in accordance with the present invention, such as fruit juices, cold water soluble tea extracts, milk, wine, beer, vinegar, and the like. It is well known to those skilled in the art that the separation of liquor adhering to the surfaces of ice crystals is a critical step in all freeze concentration systems. The system and process of the present invention, whether operated as a one-stage or two-stage system, provide a practical, effective and efficient separation of occluded liquor in the manner which promotes a significant rate of ice crystal growth.

It will be apparent that changes and modifications in the above embodiments can be made without departing from the scope of the invention. For example, separation means other than in-line filters, such as a centrifuge, may be used to separate concentrated liquor from the system. Similarly, crystallizers other than scraped surface heat exchangers may be used, and/or a plurality of crystallizers connected in parallel may be used. The scope of the invention is intended, therefore, to be limited only by the scope of the appended claims.

What is claimed is:

1. A subassembly for reducing the environment viscosity of ice crystals in an aqueous liquid slurry formed in a freeze concentration system, which comprises a gradient column having
   slurry inlet means at one end of the column for introducing a slurry of ice crystals in an aqueous liquid into the column,
   liquid outlet means for removing liquid from said column,
   filter means in said column intermediate the slurry inlet means and the liquid outlet means for separating ice crystals from the liquid fraction of the slurry,
   means for forming the ice into a porous bed of agglomerated ice crystals which rises to the opposite end of the column and controlling the degree of compaction of the ice bed, said means including rotatable perforated means adjacent the opposite end of the column for restraining and regulating upward movement of the ice bed and removing ice from the ice bed,
   liquid inlet means in the opposite end of the column for supplying dilute liquid into the column above said rotatable perforated means, add
   slurry outlet means in the opposite end for removal from the column of a slurry of ice removed from the ice bed in said dilute liquid.

2. The subassembly defined in claim 1 in which said filter means comprises a screen member mounted in the column intermediate the slurry inlet means and the liquid outlet means.

3. The subassembly defined in claim 2 in which the screen member has openings of between about 0.15 mm to 0.30 mm in size.

4. The subassembly defined in claim 1 which includes a blade rotatably mounted adjacent said slurry inlet means, and said rotatable disc has scraping means on one surface adapted to remove ice from said ice bed and openings extending therethrough to permit ice removed from the ice bed to pass through said disc.

5. The subassembly defined in claim 4 which includes means for varying the rotational speed of said disc to control the degree of compaction of the porous ice bed.

6. The subassembly defined in claim 1 in which said rotatable perforated means comprises a rotatable disc which substantially covers the cross-section of said column.

7. A method for reducing the environment viscosity of ice crystals in an aqueous liquid slurry formed in a freeze concentration process which comprises
   forming a slurry of ice crystals in a first aqueous liquid into a porous rising bed of agglomerated ice crystals in which the ice crystals are occluded with said first liquid,
   contacting the porous ice crystal bed with a counter current flow of a second aqueous liquid which is more dilute and less viscous that said first liquid,
   controlling the porosity of the ice crystal bed so that said second liquid flows throughout the ice crystal bed to displace the first liquid occluded on the ice crystals in the lower portion of the ice crystal bed,
   removing ice occluded with said second liquid from the porous ice crystal bed, and
   transferring the ice removed from the ice crystal bed to said second liquid to form a slurry which is carried away from the ice crystal bed.

8. The method defined in claim 7 which comprises
   continuously introducing a slurry of ice crystals in a first aqueous liquid under pressure into one end of a confined zone,
   separating the ice crystal fraction from the liquid fraction of said slurry and removing said liquid fraction from the confined zone,
   moving said ice crystal fraction away from said one end of the confined zone,
   restraining the movement of the ice crystal fraction to form said porous bed of agglomerated ice crystals,
   introducing said second aqueous liquid into the opposite end of the confined zone above the ice crystal bed whereby a minor portion of said second liquid flows through the ice crystal bed and the major portion of said second liquid carries ice removed from the ice crystal bed out of the confined zone.

9. The method defined in claim 8 in which the porosity of the ice crystal bed is controlled by controlling the amount of ice removed from the ice crystal bed.

10. The method defined in claim 9 in which the porosity of the ice crystal bed is such that it is sufficiently porous to permit the flow of said second aqueous liquid throughout the bed of ice crystals, but is sufficiently compacted so that the amount of the second aqueous liquid which passes through the ice bed does not excessively dilute the first aqueous liquid removed from the confined zone.

11. The method defined in claim 10 in which the portion of said second liquid which flows through the ice crystal bed is combined with said first liquid to reduce the concentration of said first liquid by no more than about 4% (absolute basis).

12. The method defined in claim 10 in which the ice crystal bed has a height to diameter ratio of between about 0.5:1 to 3:1.

13. The method defined in claim 8 in which the displacement of the first liquid occluded on the ice crystals by the second liquid occurs in the portion for the ice bed adjacent said one end of the confined zone.

14. The method defined in claim 8 in which the first aqueous liquid is concentrated liquor having a solids content of from 36% to 50% or intermediate concentration liquor having a solids content of from 10% to 30%, and said second aqueous liquid has a solids content less than the first liquid.

15. A continuous freeze concentration system for concentrating an aqueous feed liquid which comprises at least one concentrating stage which includes (a) crystallizer means for treating a first aqueous liquid-containing stream to crystallize ice from said liquid and form a slurry of ice crystals in said liquid, (b) gradient column means operatively connected with said crystallizer means for reducing the environment viscosity of ice crystals in the slurry introduced into the gradient column means from the crystallizer means, said gradient column means including means for separating ice crystals from the first aqueous liquid in said slurry, means for forming the ice crystals into a porous, rising bed of agglomerated ice crystals having a controlled porosity, means for introducing a more dilute aqueous liquid into the gradient column counter current to the rising porous ice bed whereby the first liquid occluded on the ice is displaced with said more dilute aqueous liquid, and means for transferring ice from the ice bed to said more dilute aqueous liquid to form a slurry thereof, and (c) recycle means operatively connected with said gradient column means and said crystallizer means for supplying liquid separated from ice in the gradient column means to said crystallizer means, and wash column means operably coupled with said gradient column means for receiving the slurry of ice in said more dilute aqueous liquid from said gradient column, said wash column means including means for introducing wash water therein and being adapted to wash and separate ice from said more dilute aqueous liquid.

16. The freeze concentration system defined in claim 15 in which filter means are provided intermediate the crystallizer means and said gradient column means for removing a portion of the first aqueous liquid from said slurry.

17. The freeze concentration system defined in claim 15 in which first aqueous said gradient column means includes
slurry inlet means for introducing the slurry of ice in said liquid into said gradient column means,
liquid outlet means for removing liquid from the gradient column means,
filter means intermediate the slurry inlet mean and the liquid outlet means for separating ice from the liquid in the slurry,
scraper means rotatably mounted adjacent said slurry inlet means,
rotatable disc means mounted across the gradient column means adjacent the opposite end of the column for restraining upward movement of the ice bed and removing ice crystals from the ice bed, said rotatable disc having openings therethrough for passing the ice crystals removed from the ice bed through said disc,
liquid inlet means in said opposite end of the gradient column means for introducing the more dilute aqueous liquid into said gradient column, and
slurry outlet means in said opposite end of the gradient column means for removing the slurry of ice in more dilute aqueous liquid from the gradient column.

18. The freeze concentration system defined in claim 17 which includes means for rotating said scraper means and said disc means in opposite directions.

19. The freeze concentration system defined in claim 17 in which the slurry of ice in the first aqueous liquid is introduced into the gradient column means at a point between the filter means and the rotatable disc means.

20. The freeze concentration system defined in claim 15 which includes a two-stage concentration system for concentrating a dilute aqueous feed stream comprising in combination a first stage including:
first crystallizer means for treating a stream containing intermediate concentration liquor to crystallize ice from said liquor and provide a slurry of ice crystals in intermediate concentration liquor,
means for introducing the stream containing intermediate concentration liquor into said first crystallizer,
first gradient column means into which said slurry is introduced for reducing the environment viscosity of the ice crystal fraction of said slurry, said first gradient column means including filter means for separating ice crystals in said slurry from the intermediate concentration liquor, means for forming the ice crystals into a porous, rising bed of agglomerated ice crystals having a controlled porosity, and means for introducing dilute liquor into the gradient column means, counter current to said rising ice bed, to replace intermediate concentration liquor occluded on the ice crystals with dilute feed liquor,
means for introducing the slurry of ice crystals in intermediate concentration liquor from the first crystallizer means into the first gradient column means,
means for removing ice crystals occluded with dilute liquor from the porous ice bed in the first gradient column means and forming a slurry of ice crystals in dilute feed liquor,
means for withdrawing intermediate concentration liquor from the first gradient column means,
wash column means for washing and separating ice removed from the ice bed in the first gradient column means from dilute feed liquor occluded thereon, the wash column means including means for introducing wash water therein,
means for introducing the slurry of ice in dilute feed liquor from the first gradient column means into the wash column means, and
means for removing ice from the wash column means; and a second stage including:
second crystallizer means for treating a stream of concentrated liquor to produce a slurry of ice crystals in concentrated liquor,
filter means for withdrawing a portion of the concentrated liquor from the slurry produced in said second crystallizer means,
second gradient column means for separating ice crystals produced in the second crystallizer means from concentrated liquor and replacing concentrated liquor occluded on the ice crystals with intermediate concentration liquor, said second gradient column means including filter means for separating ice crystals in said slurry from the concentrated liquor, means for forming the ice crystals into a porous rising bed of agglomerated ice crystals having a controlled porosity, and means for introducing intermediate concentration liquor withdrawn from the first gradient column means into the second gradient column means counter current to said rising porous ice bed to replace concentrated liquor occluded on the ice crystals with intermediate concentration liquor, means for introducing the slurry of ice crystals in concentrated liquor from said second crystallizer means into said second gradient column means, means for removing ice crystals occluded with intermediate concentration liquor from the porous ice bed in the second gradient column and forming a slurry of said ice crystals in intermediate concentration liquor, means for transferring the slurry of ice crystals in intermediate concentration liquor into said first crystallizer means, and means for withdrawing concentrated liquor from said second gradient column means for introduction into said second crystallizer means.

21. The freeze concentration system defined in claim 20 in which said first and said second gradient column means both include filter means secured across the gradient column adjacent one end and thereof for separating ice from the liquor fraction of a slurry, a rotatable disc mounted across the column adjacent the opposite end of the gradient column, said disc having scraping means for removing ice from the porous ice bed and openings therethrough for passing ice crystals removed from the ice bed throughout the disc, a blade rotatably mounted adjacent said one end of the column, motor means for rotating said disc and said blade, and means for introducing the slurry of ice crystals in liquor into the gradient column under pressure at a point intermediate the filter means and the rotatable disc.

22. The freeze concentration system defined in claim 21 in which the filter means comprises a screen member secured across the gradient column adjacent the bottom thereof, with the slurry of ice in liquor being introduced into the gradient column on the upper surface of the screen member, and the rotatable disc is mounted across the column adjacent the top of the column.

23. The freeze concentration system defined in claim 21 in which the rotatable disc has openings therethrough of sufficient size and number to permit the upward passage through the disc of ice crystals removed from the ice bed, and to permit the counter-current flow of liquor through the disc into the ice bed.

24. A continuous counter current freeze concentration method for concentrating an aqueous liquid, which comprises introducing a stream of an aqueous feed liquor counter current to a porous bed of agglomerated ice crystals occluded with concentrated liquor whereby the concentrated liquor occluded on the ice crystals is displaced by feed liquor and the ice crystals grow in size, cooling the liquor displaced from the ice crystals in said bed to crystallize ice therefrom and form a viscous slurry of ice crystals in concentrated liquor, circulating the viscous slurry of ice crystals in concentrated liquor to said porous bed of ice crystals, separating the concentrated liquor fraction of the viscous slurry from the ice fraction, forming the ice fraction of said viscous slurry into a porous bed of agglomerated ice crystals occluded with concentrated liquor for contact with said feed liquor, controlling the porosity of the ice crystal bed, removing the enlarged ice crystals occluded with feed concentration liquor from the ice bed and transferring said ice crystals to feed concentration liquor to form a slurry thereof, and introducing the slurry of enlarged ice crystals in feed liquor into a wash column in which the ice fraction of the slurry is separated from the feed liquor and feed concentration liquor occluded on the ice crystals is displaced by wash water.

25. The method defined in claim 24 in which a portion of the concentrated liquor fraction of the viscous slurry is removed and recovered as product as the viscous slurry is circulated to the bed of ice crystals.

26. The method defined in claim 25 in which the aqueous feed liquor has a solids content of about 2%–20% and the concentrated liquor has a solids content of greater than about 36%.

27. The method defined in claim 24 in which a major portion of the aqueous feed liquor stream introduced to the bed of ice crystals is combined with the enlarged ice crystals removed from the ice crystal bed to form the slurry which is introduced into the wash column, with the remainder of said aqueous feed liquor stream passing through the bed of ice crystals to displace concentrated liquor occluded thereon.

28. The method defined in claim 24 in which the feed liquor separated in the wash column is recirculated for introduction to the bed of ice crystals.

29. The method defined in claim 24 in which the stream of aqueous feed liquor is passed downwardly counter current to a rising porous bed of ice crystals.

30. The method defined in claim 24 in which the viscous slurry of ice crystals in concentrated liquor is formed into the porous ice bed by pumping the slurry under pressure into one end of a confined zone, separating the ice crystals from the concentrated liquor fraction of the slurry, with said concentrated liquor fraction being removed from the confined zone, moving the ice crystals in an upward direction in said confined zone while restraining and regulating the upward flow of ice crystals to thereby form a porous bed of agglomerated ice crystals in the gradient zone removing ice crystals from the upper end of the ice crystal bed.

31. The method defined in claim 30 in which the extend of compaction of the bed of ice crystals in controlled by regulating the rate of removal of ice crystals from the bed.

32. The method defined in claim 31 in which the porosity of the bed of ice crystals is sufficient to permit the counter current flow of aqueous feed liquor throughout the bed of ice crystals, but is sufficiently compacted so that the amount of feed liquor which passes through the ice bed does not excessively dilute the concentrated liquor removed from the confined zone.

33. The method defined in claim 30 in which concentrated liquor displaced from the ice crystals is combined with the concentrated liquor fraction of the viscous slurry to form a combined stream of concentrated liquor which is cooled to crystallize ice therefrom and form the viscous slurry.

34. A continuous multistage freeze concentration method for concentrating an aqueous liquid, which comprises introducing a stream of aqueous feed liquor into a first concentrating stage counter current to a porous bed of agglomerated ice crystals occluded with liquor of intermediate concentration whereby the intermediate concentration liquor occluded on the ice crystals is displaced by feed concentration liquor and the ice crystals grow in size, removing intermediate concentration liquor from said first concentrating stage, removing enlarged ice crystals occluded with feed concentration liquor from the ice bed in the first concentrating stage and transferring the ice crystals to feed concentration liquor to form a slurry thereof, passing the slurry of ice crystals in feed concentration liquor to a wash column for separation of the feed concentration liquor from the enlarged ice crystals, introducing intermediate concentration liquor removed from said first concentrating stage into a second concentrating stage counter current to a porous bed of agglomerated ice crystals occluded with concentrated liquor whereby the concentrated liquor occluded on the ice crystals is displaced by intermediate concentration liquor, removing ice crystals occluded with intermediate concentration liquor from the second concentration stage ice bed and transferring the ice crystals to intermediate concentration liquor to form a slurry thereof, cooling the slurry of ice crystals in intermediate concentration liquor to crystallize ice from said liquor and form a thickened slurry of ice crystals in intermediate concentration liquor in which the ice crystals are occluded with said intermediate concentration liquor, circulating the thickened slurry to the porous ice bed in the first concentrating stage, separating the ice crystal fraction of said thickened slurry from the intermediate concentration liquor fraction thereof with the separated intermediate concentration liquor fraction of the thickened slurry being combined with the intermediate concentration liquor displaced from the bed of ice crystals in said first concentrating state, to form a combined stream of intermediate concentration liquor which is discharged from said first concentrating stage forming the ice crystal fraction of said thickened slurry into a porous bed of agglomerated ice crystals occluded with intermediate concentration liquor in the first concentration stage, controlling the porosity of said ice crystal bed, cooling the concentrated liquor discharged from the second concentrating stage to crystallize ice from the liquor and form a viscous slurry of ice crystals in concentrated liquor, circulating the viscous slurry to the porous ice bed in the second concentration stage, removing a portion of the concentrated liquor from said viscous slurry prior to introducing the viscous slurry into the second concentrating stage, separating the ice crystal fraction of said viscous slurry from the concentrated liquor fraction thereof with the separated concentrated liquor fraction of the viscous slurry being combined with the concentrated liquor displaced from the ice bed in said second concentrating stage, to form a combined stream of concentrated liquor which is discharged from the second concentrating stages, forming the ice crystal fraction of said viscous slurry into a porous bed of ice crystals occluded with concentrated liquor in the second concentration stage, and controlling the porosity of the ice crystal bed in the second concentration stage.

35. The method defined in claim 34 in which the feed liquor has a solids content of about 2%–20%, the liquor fraction of the thickened slurry has a solids content of about 10%–30%, and the liquor fraction of the viscous slurry has a solids content of at least about 36%.

36. The method defined in claim 34 in which the porous bed of ice crystals in both the first and second concentrating stages is formed by pumping the slurry of ice in liquor into one end of a closed zone, separating the ice crystals from the liquor fraction of the slurry, with the liquor fraction being removed from the closed zone, causing the ice crystals to move to the end of the closed zone opposite the end at which the slurry was introduced while restraining and regulating the flow of ice crystals to thereby form a bed of agglomerated ice crystals in the closed zone, and removing ice crystals from the end of the ice crystal bed opposite the end at which the slurry is introduced.

37. The method defined in claim 36 in which the slurry is introduced under pressure at the bottom end of the closed zone and the mass of ice crystals in the zone moves in an upward direction therein with ice crystals being removed from the upper end of the ice crystal bed.

38. The method defined in claim 36 in which the extent of compaction of the bed of ice crystals is controlled by regulating the rate of removal of ice crystals from the bed.

39. The method defined in claim 38 in which the porosity of the bed of ice crystals is sufficient to permit the counter current flow of liquor throughout the bed of ice crystals, but is sufficiently compacted that the amount of liquor which passes through the ice bed does not excessively dilute the liquor removed from the confined zone.

40. The method defined in claim 34 in which a major portion of the aqueous feed liquor introduced into the first concentrating stage is combined with the enlarged ice crystals removed from the ice bed in the first concentrating stage for introduction into the wash column, with the remainder of said aqueous feed liquor passing through the bed of ice crystals to displace intermediate concentration liquor occluded thereon.

41. The method defined in claim 34 in which a major portion of the intermediate concentration liquor introduced into the second concentrating stage is combined with ice crystals removed from the ice bed in the second concentrating stage to form a slurry thereof which is passed to a first crystallizer zone to form the thickened slurry, with the remainder of said intermediate concentration liquor passing through the bed of ice crystals in the second concentration zone to displace concentrated liquor occluded thereon.

42. The method defined in claim 34 in which the feed liquor separated from the ice crystals in the wash column is recirculated for introduction into the first concentrating stage.

* * * * *